(No Model.)
W. J. FREDERICK.
VALVE.
No. 582,911. Patented May 18, 1897.
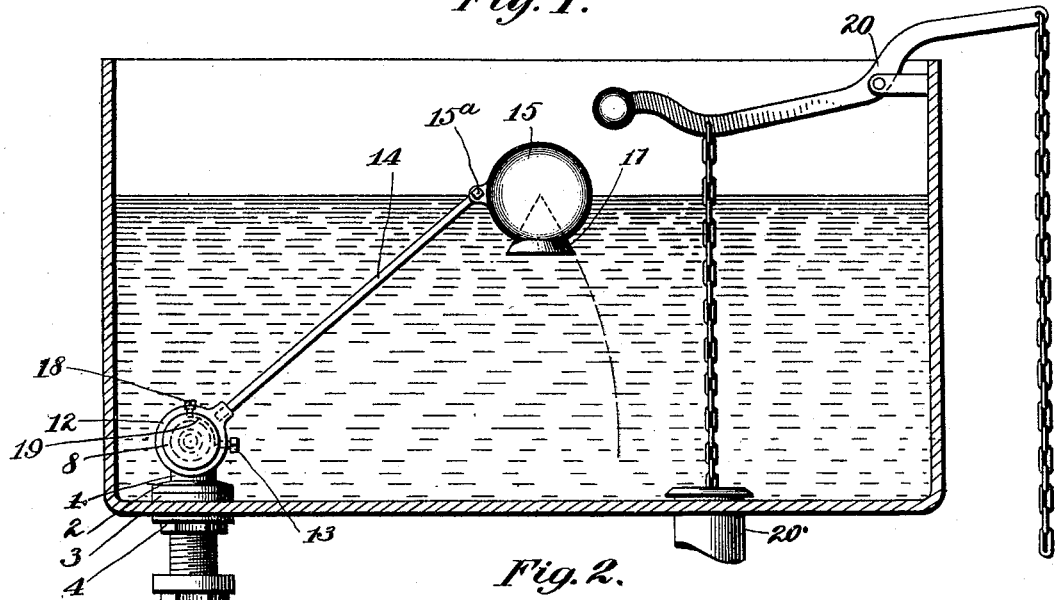
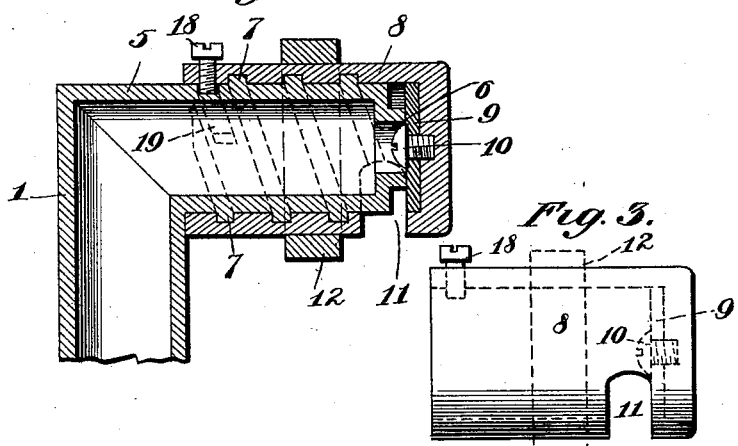
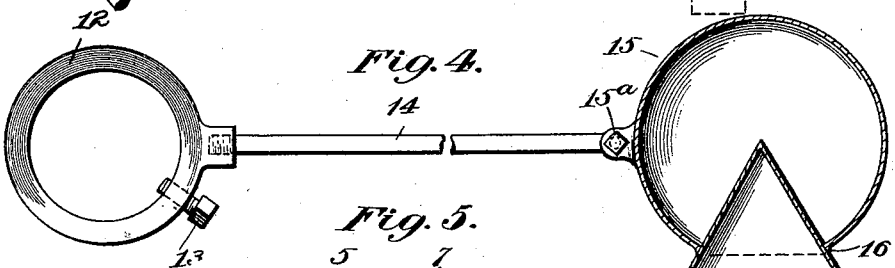
Witnesses
John H. Gardner
William W. Wright
Inventor
Will J. Frederick
By Edw. T. Duvall Jr.
his Attorney

UNITED STATES PATENT OFFICE.

WILL JOSEPH FREDERICK, OF PITTSTON, PENNSYLVANIA.

VALVE.

SPECIFICATION forming part of Letters Patent No. 582,911, dated May 18, 1897.

Application filed October 21, 1896. Serial No. 609,579. (No model.)

*To all whom it may concern:*

Be it known that I, WILL JOSEPH FREDERICK, a citizen of the United States, residing at Pittston, in the county of Luzerne and State of Pennsylvania, have invented certain new and useful Improvements in Valves; and I do hereby declare the following to be a full, clear, and exact description of the invention, such as will enable others skilled in the art to which it appertains to make and use the same.

My invention relates to improvements in valves, and more particularly to that class which may be termed "balanced" or "ballcock" valves for use in water-closet tanks, although it is designed and adapted for general use where the supply of water is to be automatically controlled.

The objects are to provide a cheap and efficient valve constructed with the fewest parts possible, to provide a valve which will be assisted in opening by the coaction of the water and the improved float which I employ, and to provide one which can be set to regulate the quantity of water to be admitted to the tank.

With these and other objects and advantages in view my invention consists, essentially, of a supply-pipe and a cap for said pipe which is provided with an exit-opening, through which the water is permitted to flow when the cap, by the falling of the float, is moved sufficiently to uncover the opening in the end of the supply-pipe. Combined with these elements I employ a float of novel construction to prevent binding of any of the valve parts.

In the accompanying drawings, illustrating my invention, Figure 1 is a longitudinal sectional view of a water-closet tank provided with my improved supply-valve. Fig. 2 is a longitudinal sectional view of the valve. Fig. 3 is a side elevation of the cap. Fig. 4 is a detail view, partly in section, of the float and attachment-band; and Fig. 5 is a plan view of the end of the supply-pipe without the cap.

Like numerals of reference designate like parts throughout all the figures of the drawings.

In constructing the valve according to my invention I employ a pipe-section 1, bent at an angle at one end and the other screw-threaded and projected through the tank, where it is joined with the service-pipe by means of the soldering-nipple to which said service-pipe is "wiped," as is well known to those versed in this art. This pipe-section is provided with an annular flange 2 and a rubber washer 3 on the inside of the tank and a lock-nut 4 on the outside, which serve to form a water-tight joint between said pipe-section and the tank.

The angular portion of the pipe-section, which I will designate as 5, has its bore restricted at the end, as at 6, and said portion of the pipe is provided with a quick heavy right or left hand thread 7, on which is designed to work a metal cap 8. This cap 8 is provided with a washer 9, of lead or composition, which is secured to the top on the interior by means of a screw 10 or other suitable fastening, and against this washer the restricted end of the pipe 5 is intended to abut when the inflowing water has reached the desired level and the supply is to be cut off.

The cap 8 is provided adjacent to the top thereof with a transverse slot or opening 11, which is the exit for the water when the cap has been revolved away from the restricted opening 6.

Secured to the cap 8 by the annular band 12 and set-screw 13 is a ball-spindle 14, carrying a ball-float 15. This ball may be constructed of any suitable material and is adjustably secured to the spindle by the threaded bolt 15$^a$, passing through a perforation in the end of the spindle and into a threaded perforation in an ear formed on said ball-float. Formed in this ball-float is a circular opening 16, in which is soldered or otherwise suitably fastened an open cone 17. The suction of this cone upon the surface of the water due to the formation of a partial vacuum therein is sufficient to overcome all binding of the valve parts and particularly the parts 6 and 9. This is an important feature, as a locking of the parts of the valve proper while closed would result in the suspension of the float in the air and a cutting off of the supply of water.

The partial vacuum is formed or created by the expulsion of a quantity of the air in this cone or chamber, when the tank is flooded and the water enters the chamber in a turbulent or disturbed condition.

Near the open end of the cap 8 is a perforation in which is threaded a set-screw 18, the end of which projects into a groove 19, formed in the angular portion 5 of the pipe-section 1. This groove is parallel to the thread on the pipe and extends around said pipe a portion of its circumference only. The end walls of this groove act as stops for the set-screw 18, thus limiting the revolution of the cap 8. By so adjusting the band 12 on the cap 8 the ball-float may be allowed an extremely low elevation or an extremely high elevation, thus controlling the quantity of water to be admitted to the tank. To adjust the float for a smaller quantity of water than usual, turn the set-screw 13 and slip the band 12 partially to the right and there secure it. This will increase the distance between the ball-float spindle 14 and the set-screw 18, and consequently decrease the distance between said set-screw and the limiting end wall of the groove 19, thus decreasing the arc of movement of the float itself. This completes the construction of my valve, and where it is used in a tank for water-closets of course the same will be supplied with the usual exhausting mechanism 20.

I have here illustrated left-hand threads on the angular portion of the pipe-section, but I would at the same time have it plainly understood that in the practice of the invention I will use either left or right hand threads, and I can also form the threads in the interior of the cap and the thread-grooves on the angular portion of the pipe-section equally as well as in the present way.

I do not desire to otherwise limit myself to the precise details of construction herein shown and described, but reserve to myself the right and privilege to alter the same within the bounds of mechanical ingenuity without departing from the spirit of my invention.

Having thus described my invention, what I claim as new, and desire to secure by Letters Patent, is—

1. In a valve, the combination with a supply-pipe, having its end screw-threaded and formed with a peripheral groove, parallel with the screw-threads in the pipe; of a cap screw-threaded thereon and designed to act as a cut-off, a slot or opening in said cap, through which the water passes when the cap uncovers the bore of the supply-pipe, the stop-pin passing through said cap and engaging with the groove in the pipe, the band adjustably secured on said cap, the swinging float connected thereto, and an open air-chamber formed in the under side of said float, and designed to cause said float to follow the falling water in the tank and prevent binding of the valve parts.

2. In a valve, the combination with a supply-pipe, having external screw-threads and formed with a peripheral groove, parallel with said threads, the cap fitting on said pipe, having a slot or opening, and provided with corresponding threads, the washer located in the said cap, the stop-pin passing through the cap and engaging with said groove, of the band, the spindle secured thereto, the float pivoted to said spindle, the open cone secured to the under side of the float, and the set-screw for adjustably securing said band to the cap, whereby the length of movement of the said cap, from the end of the pipe, may be varied to regulate the quantity of water to be supplied, substantially as described.

In testimony whereof I affix my signature in presence of two witnesses.

WILL JOSEPH FREDERICK.

Witnesses:
CHARLES E. RIORDON,
H. O. CHAMBERLIN.